(12) United States Patent
Wu et al.

(10) Patent No.: US 12,492,936 B2
(45) Date of Patent: Dec. 9, 2025

(54) WEARABLE DEVICE AND COMMUNICATION METHOD FOR ENHANCING DETECTION ACCURACY

(71) Applicant: HTC Corporation, Taoyuan (TW)

(72) Inventors: Chun-Yih Wu, Taoyuan (TW); Ta-Chun Pu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/422,372

(22) Filed: Jan. 25, 2024

(65) Prior Publication Data
US 2025/0180401 A1      Jun. 5, 2025

(30) Foreign Application Priority Data
Dec. 4, 2023   (TW) .................................. 112147068

(51) Int. Cl.
*G01J 1/44*   (2006.01)
*G02B 6/12*   (2006.01)
*H04B 10/50*  (2013.01)

(52) U.S. Cl.
CPC ............ *G01J 1/44* (2013.01); *G02B 6/12004* (2013.01); *H04B 10/502* (2013.01); *G01J 2001/446* (2013.01)

(58) Field of Classification Search
CPC .. G01J 1/44; G01J 2001/446; G02B 6/12004; H04B 10/502; A61B 5/6803
See application file for complete search history.

(56) References Cited

U.S. PATENT DOCUMENTS

2008/0205904 A1*  8/2008  Shinagawa .......... H04B 13/005
                                                       398/186
2020/0200972 A1*  6/2020  Steglich ............. G01N 15/1484
(Continued)

FOREIGN PATENT DOCUMENTS

CN     112255799 A    1/2021
TW     201629520 A    8/2016

OTHER PUBLICATIONS

Tadasu Takuma, Soichi Watanbe, Tadashi Kawamoto, Kenichi Yamazaki, A review of studies on the electric field and the current induced in a human body exposed to electromagnetic fields, Aug. 21, 2006, Institute of Electrical Engineers of Japan, pp. 131-139 (Year: 2006).*

*Primary Examiner* — Georgia Y Epps
*Assistant Examiner* — Erin R Garber
(74) *Attorney, Agent, or Firm* — Birch, Stewart, Kolasch & Birch, LLP

(57) ABSTRACT

A wearable device includes a light modulator, a light source, a light waveguide, a light sensor, a processor, and a carrier element. The light modulator receives a human electric field. The light source generates a light communication signal. The light waveguide is adjacent to the light modulator. The light waveguide is configured to transmit the light communication signal. The light sensor receives the light communication signal from the light waveguide. The processor is coupled to the light sensor. The light modulator, the light source, the light waveguide, the light sensor, and the processor are disposed on the carrier element. The processor can obtain the relative information of the human electric field according to the phase change in the light communication signal.

11 Claims, 3 Drawing Sheets

(56) References Cited

U.S. PATENT DOCUMENTS

2021/0206712 A1    7/2021  Kuhne
2023/0375525 A1*  11/2023  Merritt .................... G01J 3/021
2024/0094357 A1*  3/2024  Smith ................... G01S 7/4876

* cited by examiner

WEARABLE DEVICE AND COMMUNICATION METHOD FOR ENHANCING DETECTION ACCURACY

CROSS REFERENCE TO RELATED APPLICATIONS

This application claims priority of Taiwan Patent Application No. 112147068 filed on Dec. 4, 2023, the entirety of which is incorporated by reference herein.

BACKGROUND OF THE INVENTION

Field of the Invention

The invention relates to a wearable device, and more particularly, to a wearable device and its communication method.

Description of the Related Art

Physiological signal detection devices are commonly used detection components. However, when applied in the field of VR (Virtual Reality) or AR (Augmented Reality), the detection accuracy of a conventional physiological signal detection device is usually not high enough. Accordingly, there is a need to propose a novel solution for solving the problem of the prior art.

BRIEF SUMMARY OF THE INVENTION

In an exemplary embodiment, the invention is directed to a wearable device that includes a light modulator, a light source, a light waveguide, a light sensor, a processor, and a carrier element. The light modulator receives a human electric field. The light source generates a light communication signal. The light waveguide is adjacent to the light modulator. The light waveguide is configured to transmit the light communication signal. The light sensor receives the light communication signal from the light waveguide. The processor is coupled to the light sensor. The light modulator, the light source, the light waveguide, the light sensor, and the processor are all disposed on the carrier element. The processor can obtain the relative information of the human electric field according to the phase change in the light communication signal.

In some embodiments, the wearable device is a smart watch or an HMD (Head Mounted Display).

In some embodiments, the operational frequency of the human electric field is from 10 MHz to 100 MHz.

In some embodiments, the light modulator includes a metal coupling structure and an EO (Electro-Optical) crystal element. The metal coupling structure receives the human electric field. The EO crystal element is attached to the metal coupling structure.

In some embodiments, the refractive index of the EO crystal element is variable according to the human electric field.

In some embodiments, the EO crystal element is made of a lithium niobate material or a lithium tantalate material.

In some embodiments, the light waveguide is disposed on the EO crystal element.

In some embodiments, the light source is an LED (Light-Emitting Diode) or a laser diode.

In some embodiments, the light waveguide is a Fabry-Perot waveguide.

In some embodiments, the light source further transmits an incident light signal to a human body, and the light sensor further receives a reflected light signal from the human body.

In some embodiments, the processor can further obtain the physiological information of the human body according to the reflected light signal.

In another exemplary embodiment, the invention is directed to a communication method that includes the steps of: receiving a human electric field by a light modulator; generating a light communication signal by a light source; transmitting the light communication signal by a light waveguide, wherein the light waveguide is adjacent to the light modulator; receiving the light communication signal from the light waveguide by a light sensor; and obtaining the relative information of the human electric field according to the phase change in the light communication signal.

In some embodiments, the communication method further includes: receiving the human electric field by a metal coupling structure of the light modulator, wherein an EO crystal element of the light modulator is attached to the metal coupling structure.

In some embodiments, the communication method further includes: adjusting the refractive index of the EO crystal element according to the human electric field.

In some embodiments, the communication method further includes: transmitting an incident light signal to a human body by the light source.

In some embodiments, the communication method further includes: receiving a reflected light signal from the human body by the light sensor.

In some embodiments, the communication method further includes: obtaining the physiological information of the human body according to the reflected light signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
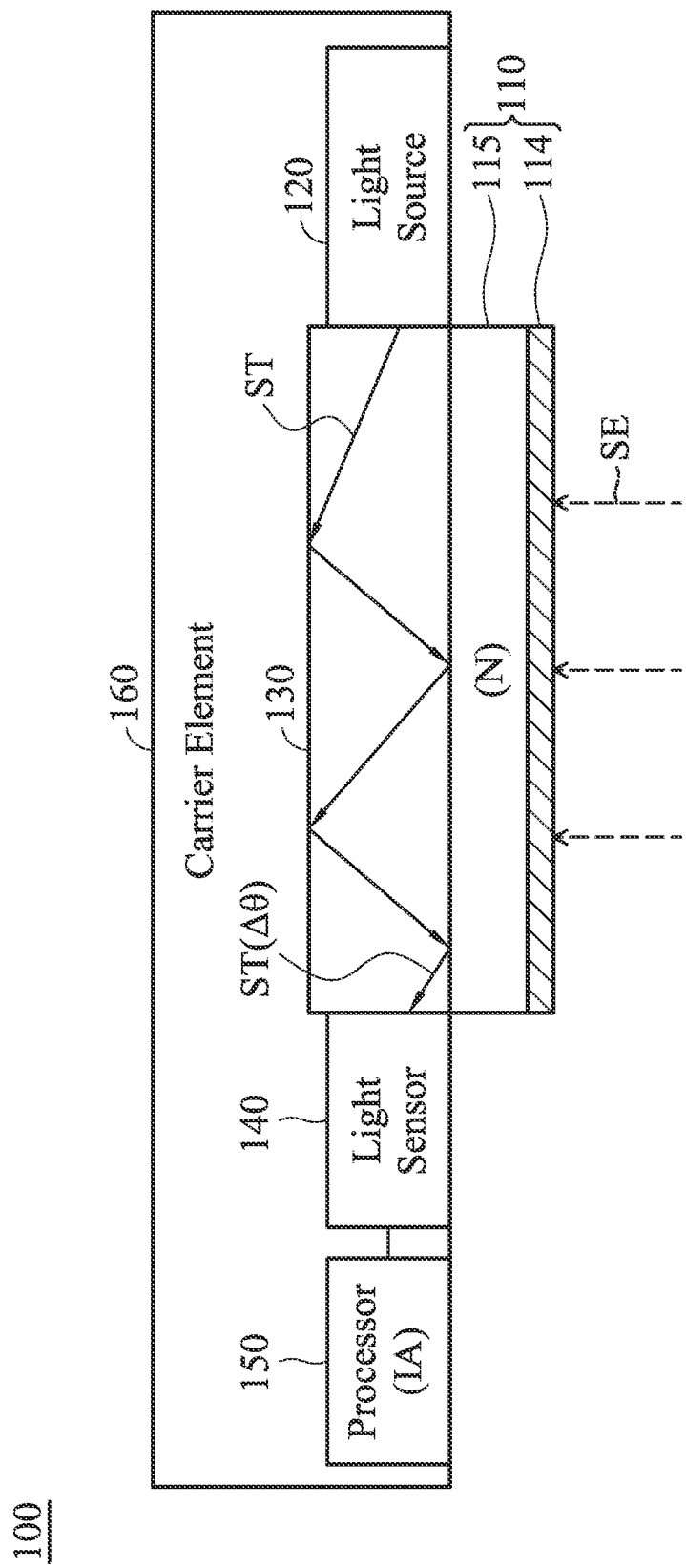
FIG. 1 is a diagram of a wearable device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection.

Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a wearable device 100 according to an embodiment of the invention. For example, the wearable device 100 may be a smart watch or an HMD (Head Mounted Display) applied to the field of VR (Virtual Reality) or AR (Augmented Reality), but it is not limited thereto. In the embodiment of FIG. 1, the wearable device 100 includes a light modulator 110, a light source 120, a light waveguide 130, a light sensor (or photodetector) 140, a processor 150, and a carrier element 160. It should be understood that the wearable device 100 may further include other components, such as a display device, a speaker, a power supply module and/or a housing, although they are not displayed in FIG. 1.

The light modulator 110 receives a human electric field SE. The human electric field SE may be from a human body (not shown). For example, the human electric field SE may be naturally generated by the human body. Alternatively, when an HBC (Human Body Communication) TX (Transmitter) (not shown) transmits an HBC signal to the human body, the human body may generate the human electric field SE in response to the HBC signal, but it is not limited thereto. In some embodiments, the operational frequency of the human electric field SE is from 10 MHz to 100 MHz.

In some embodiments, the light modulator 110 includes a metal coupling structure 114 and an EO (Electro-Optical) crystal element 115. The shape of the metal coupling structure 114 is not limited in the invention. The EO crystal element 115 may be made of a lithium niobate (LiNbO$_3$) material or a lithium tantalate (LiTaO$_3$) material. Specifically, the metal coupling structure 114 receives the human electric field SE, and the EO crystal element 115 is attached to the metal coupling structure 114. The refractive index N of the EO crystal element 115 is variable according to the human electric field SE. For example, the value of the aforementioned refractive index N may be substantially proportional to the strength of the human electric field SE, but it is not limited thereto.

The light source 120 generates a light communication signal ST. For example, the light source 120 may be an LED (Light-Emitting Diode) or a laser diode, but it is not limited thereto.

The light waveguide 130 is disposed adjacent to the light modulator 110. The light waveguide 130 transmits the light communication signal ST. For example, the light waveguide 130 may be a Fabry-Perot waveguide, but it is not limited thereto. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). In some embodiments, the light waveguide 130 is disposed on the EO crystal element 115 of the light modulator 110. That is, the light waveguide 130 and the EO crystal element 115 can directly touch each other, so as to enhance the interactive relationship therebetween.

The light sensor 140 receives the light communication signal ST from the light waveguide 130. The processor 150 is coupled to the light sensor 140. It should be noted that the processor 150 obtains the relative information IA of the human electric field SE according to the phase change Δθ in the light communication signal ST.

The carrier element 160 may be made of a nonconductive material, and its shape and size are not limited in the invention. The light modulator 110, the light source 120, the light waveguide 130, the light sensor 140, and the processor 150 are all disposed on the carrier element 160. For example, if the wearable device 100 is a smart watch, the carrier element 160 may a watch frame element of the smart watch.

Generally, since the refractive index N of the EO crystal element 115 of the light modulator 110 is variable according to the human electric field SE, the refraction and reflection of the light waveguide 130 adjacent to the light modulator 110 are affected by the human electric field SE. Then, the aforementioned refraction and reflection cause the phase change Δθ in the light communication signal ST transmitted inside the light waveguide 130. Finally, the processor 150 precisely estimate the relative information IA of the human electric field SE by analyzing the phase change Δθ in the light communication signal ST. For example, the relative information IA may include a heart rate or a respiratory rate, but it is not limited thereto. That is, with the design of the invention, the proposed wearable device 100 can easily collect a variety of state information of the human body, and it can also significantly improve the overall detection accuracy.

The following embodiments will introduce different configurations and detail structural features of the wearable device 100. It should be understood that these figures and descriptions are merely exemplary, rather than limitations of the invention.

Figure 2:
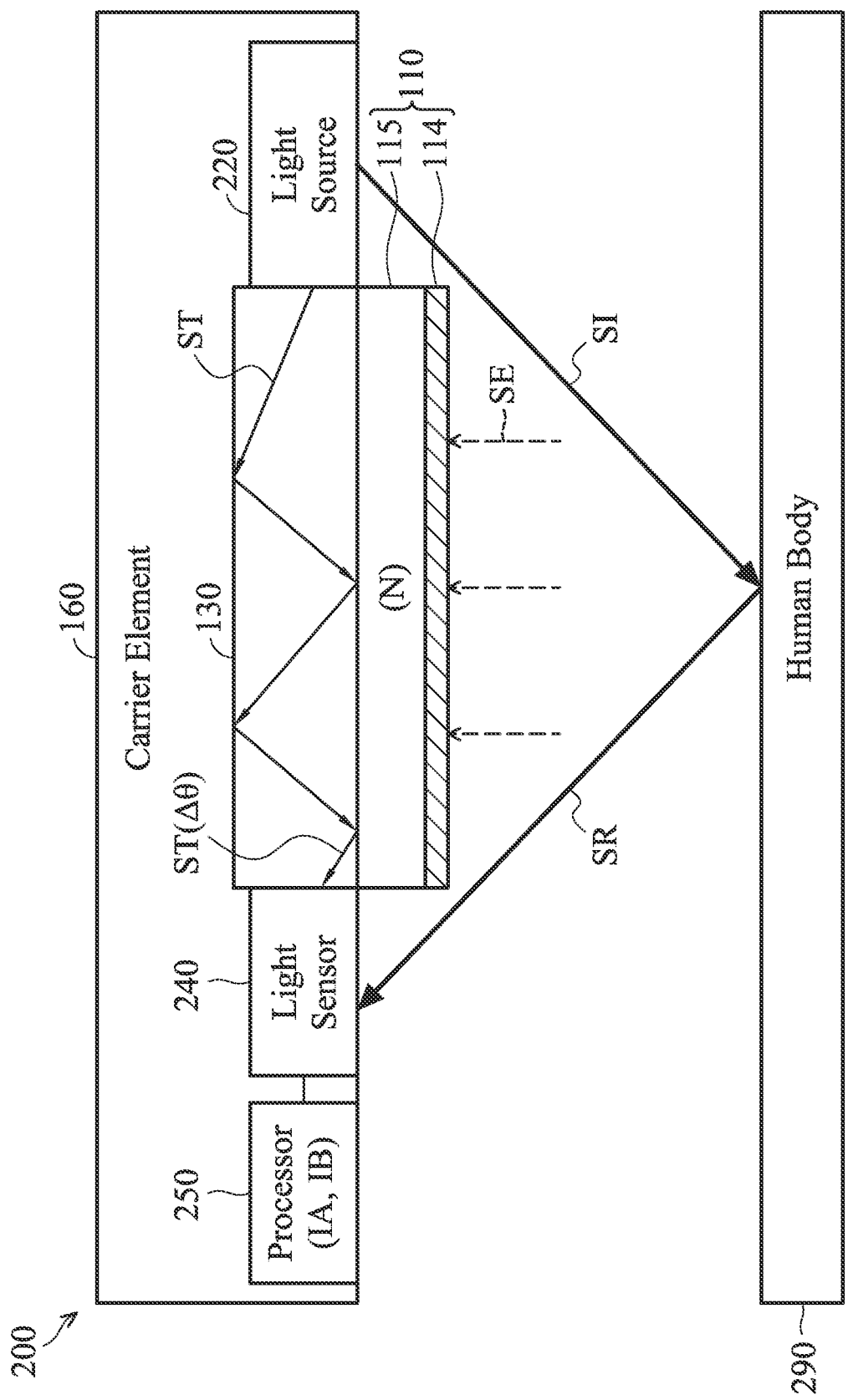
FIG. 2 is a diagram of a wearable device according to another embodiment of the invention.

FIG. 2 is a diagram of a wearable device 200 according to another embodiment of the invention. FIG. 2 is similar to FIG. 1. In the embodiment of FIG. 2, a light source 220 of the wearable device 200 further transmits an incident light signal SI to a human body 290, and a light sensor 240 of the wearable device 200 further receives a reflected light signal SR from the human body 290. The reflected light signal SR is generated according to the incident light signal SI. Next, a processor 250 of the wearable device 200 further obtains the physiological information IB of the human body 290 according to the reflected light signal SR. For example, each of the incident light signal SI and the reflected light signal SR may be red light or infrared light, the processor 250 may perform a PPG (Photoplethysmography Detection) calculation process, and the physiological information IB may include a blood oxygen concentration of the human body 290, but they are not limited thereto. With such a design, the wearable device 200 can provide both the functions of EO detection and PPG detection. Other features of the wearable device 200 of FIG. 2 are similar to those of the wearable device 100 of FIG. 1. Accordingly, the two embodiments can achieve similar levels of performance.

Figure 3:
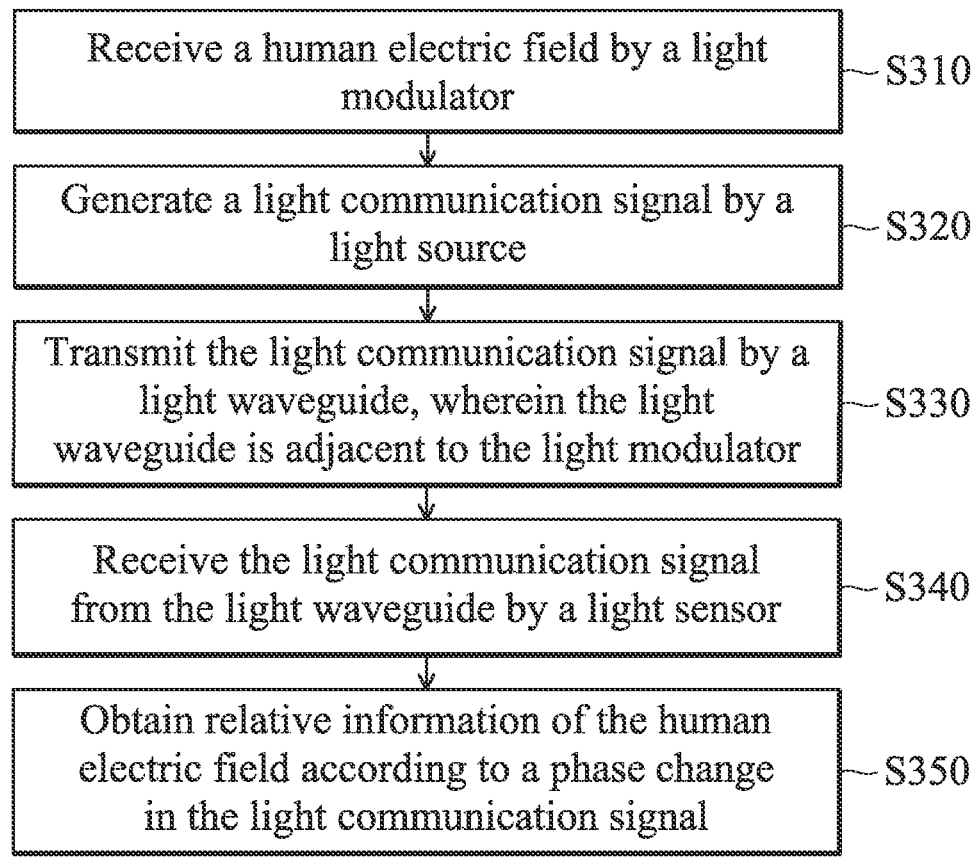
FIG. 3 is a flowchart of a communication method according to an embodiment of the invention.

FIG. 3 is a flowchart of a communication method according to an embodiment of the invention. To begin, in step S310, a human electric field is received by a light modulator. In step S320, a light communication signal is generated by a light source. In step S330, the light communication signal is transmitted by a light waveguide. The light waveguide is adjacent to the light modulator. In step S340, the light communication signal is received from the light waveguide by a light sensor. Finally, in step S350, the relative information of the human electric field is obtained according to the phase change in the light communication signal. It should be understood that these steps are not required to be performed in order, and every feature of the embodiments of FIGS. 1 and 2 may be applied to the communication method of FIG. 3.

The invention proposed a novel wearable device and a novel communication method. In comparison to the conventional design, the invention has at least the advantages of enhancing the overall detection accuracy and reducing the whole circuit complexity. Therefore, the invention is suitable for application in a variety of devices.

Note that the above element parameters are not limitations of the invention. A designer can fine-tune these setting values according to different requirements. It should be understood that the wearable device and the communication method of the invention are not limited to the configurations of FIGS. 1-3. The invention may include any one or more features of any one or more embodiments of FIGS. 1-3. In other words, not all of the features displayed in the figures should be implemented in the wearable device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A wearable device, comprising:
   a light modulator, receiving a human electric field;
   a light source, generating a light communication signal;
   a light waveguide, disposed adjacent to the light modulator, wherein the light waveguide transmits the light communication signal;
   a light sensor, receiving the light communication signal from the light waveguide;
   a processor, coupled to the light sensor; and
   a carrier element, wherein the light modulator, the light source, the light waveguide, the light sensor, and the processor are disposed on the carrier element;
   wherein the processor obtains relative information of the human electric field according to a phase change in the light communication signal;
   wherein the light source further transmits an incident light signal to a human body, and the light sensor further receives a reflected light signal from the human body;
   wherein each of the incident light signal and the reflected light signal is a red light or an infrared light;
   wherein the processor performs a PPG (Photoplethysmography Detection) calculation process on the reflected light signal, so as to obtain physiological information of the human body;
   wherein the light modulator comprises:
   a metal coupling structure, receiving the human electric field; and
   an EO (Electro-Optical) crystal element, attached to the metal coupling structure;
   wherein a refractive index of the EO crystal element is variable according to the human electric field;
   wherein a value of the refractive index is substantially proportional to a strength of the human electric field.

2. The wearable device as claimed in claim 1, wherein the wearable device is a smart watch or an HMD (Head Mounted Display).

3. The wearable device as claimed in claim 1, wherein an operational frequency of the human electric field is from 10 MHz to 100 MHz.

4. The wearable device as claimed in claim 1, wherein the EO crystal element is made of a lithium niobate material or a lithium tantalate material.

5. The wearable device as claimed in claim 1, wherein the light waveguide is disposed on the EO crystal element.

6. The wearable device as claimed in claim 1, wherein the light source is an LED (Light-Emitting Diode) or a laser diode.

7. The wearable device as claimed in claim 1, wherein the light waveguide is a Fabry-Perot waveguide.

8. A communication method, comprising the steps of:
   receiving a human electric field by a light modulator;
   generating a light communication signal by a light source;
   transmitting the light communication signal by a light waveguide, wherein the light waveguide is adjacent to the light modulator;
   receiving the light communication signal from the light waveguide by a light sensor;

obtaining relative information of the human electric field according to a phase change in the light communication signal;

transmitting an incident light signal to a human body by the light source;

receiving a reflected light signal from the human body by the light sensor, wherein each of the incident light signal and the reflected light signal is a red light or an infrared light;

performing a PPG calculation process on the reflected light signal, so as to obtain physiological information of the human body;

receiving the human electric field by a metal coupling structure of the light modulator, wherein an EO crystal element of the light modulator is attached to the metal coupling structure; and adjusting a refractive index of the EO crystal element according to the human electric field;

wherein a value of the refractive index is substantially proportional to a strength of the human electric field.

9. The communication method as claimed in claim 8, wherein an operational frequency of the human electric field is from 10 MHz to 100 MHz.

10. The communication method as claimed in claim 8, wherein the EO crystal element is made of a lithium niobate material or a lithium tantalate material.

11. The communication method as claimed in claim 8, wherein the light waveguide is disposed on the EO crystal element.

* * * * *